(12) United States Patent
Kersten et al.

(10) Patent No.: US 10,781,081 B2
(45) Date of Patent: Sep. 22, 2020

(54) TOWER CRANE FOR ERECTING A WIND TURBINE, AND METHOD FOR ERECTING SAID TOWER CRANE

(71) Applicant: WOBBEN PROPERTIES GMBH, Aurich (DE)

(72) Inventors: Roy Kersten, Hohenwarthe (DE); Frank Knoop, Aurich (DE); Ludger Janssen, Aurich (DE); Tim Janssen, Aurich (DE); Rolf Coners, Elisabethfehn (DE)

(73) Assignee: Wobben Properties GmbH, Aurich (DE)

( * ) Notice: Subject to any disclaimer, the term of this patent is extended or adjusted under 35 U.S.C. 154(b) by 404 days.

(21) Appl. No.: 15/532,867

(22) PCT Filed: Sep. 29, 2015

(86) PCT No.: PCT/EP2015/072311
§ 371 (c)(1),
(2) Date: Jun. 2, 2017

(87) PCT Pub. No.: WO2016/091413
PCT Pub. Date: Jun. 16, 2016

(65) Prior Publication Data
US 2017/0334685 A1   Nov. 23, 2017

(30) Foreign Application Priority Data
Dec. 9, 2014   (DE) .................. 10 2014 225 336

(51) Int. Cl.
*B66C 23/18*   (2006.01)
*B66C 23/72*   (2006.01)
(Continued)

(52) U.S. Cl.
CPC ............ *B66C 23/185* (2013.01); *B66C 13/16* (2013.01); *B66C 13/18* (2013.01); *B66C 23/022* (2013.01);
(Continued)

(58) Field of Classification Search
CPC ..... B66C 23/022; B66C 23/025; B66C 23/26; B66C 23/72; B66C 23/185; B66C 13/16; B66C 13/18
See application file for complete search history.

(56) References Cited

U.S. PATENT DOCUMENTS

| 2,741,373 A | * | 4/1956 | Edgar | ..................... B66C 13/18 |
|  |  |  |  | 212/302 |
| 2,961,102 A | * | 11/1960 | Pitman | .................... B66C 13/18 |
|  |  |  |  | 212/304 |

(Continued)

FOREIGN PATENT DOCUMENTS

| CH | 657889 A5 | 9/1986 |
| CH | 658277 A5 | 10/1986 |

(Continued)

*Primary Examiner* — Michael E Gallion
(74) *Attorney, Agent, or Firm* — Seed Intellectual Property Law Group LLP

(57) ABSTRACT

A rotating tower crane for erecting a wind turbine, having a tower and a tower substructure, which is connected to the tower and is intended for supporting the tower, wherein the tower substructure has a supporting cross frame, which has three or more, preferably four, legs, extending from the tower. It is proposed that each leg has fastened on it, on the ground side, a load-distributor plate, which is not connected to the foundation, wherein the load-distributor plates together form the ballast of the tower.

20 Claims, 3 Drawing Sheets

(51) Int. Cl.
  *B66C 23/26* (2006.01)
  *B66C 13/16* (2006.01)
  *B66C 13/18* (2006.01)
  *B66C 23/02* (2006.01)

(52) U.S. Cl.
  CPC ............ *B66C 23/025* (2013.01); *B66C 23/26* (2013.01); *B66C 23/72* (2013.01)

(56) References Cited

U.S. PATENT DOCUMENTS

| | | | | |
|---|---|---|---|---|
| 3,361,268 | A * | 1/1968 | Pingon | B66C 23/344 |
| | | | | 212/197 |
| 3,944,081 | A * | 3/1976 | Wellman | B66C 23/34 |
| | | | | 212/296 |
| 4,111,316 | A * | 9/1978 | Wappler | B66C 23/40 |
| | | | | 212/180 |
| 5,580,095 | A | 12/1996 | Fukumoto | |
| 6,202,013 | B1 * | 3/2001 | Anderson | B66C 13/40 |
| | | | | 701/50 |
| 7,446,549 | B2 * | 11/2008 | Tomita | G01R 31/3008 |
| | | | | 324/133 |
| 9,003,721 | B1 * | 4/2015 | Jensen | E02D 27/425 |
| | | | | 52/126.1 |
| 9,068,366 | B2 * | 6/2015 | Petzold | B66C 23/78 |
| 9,550,475 | B1 * | 1/2017 | Walker | B66C 23/78 |
| 2007/0012641 | A1 * | 1/2007 | Hinata | B66C 23/80 |
| | | | | 212/277 |
| 2007/0059142 | A1 * | 3/2007 | Dambroseo | B66C 23/205 |
| | | | | 414/561 |
| 2010/0067989 | A1 * | 3/2010 | Brown | B63B 27/02 |
| | | | | 405/196 |
| 2014/0202971 | A1 * | 7/2014 | Bosco | B66C 23/207 |
| | | | | 212/296 |
| 2015/0337798 | A1 * | 11/2015 | Clymans | B66C 23/185 |
| | | | | 212/273 |
| 2018/0282135 | A1 * | 10/2018 | Konijn | B66C 23/26 |
| 2019/0152751 | A1 * | 5/2019 | Midorikawa | B66C 23/90 |
| 2019/0193999 | A1 * | 6/2019 | Chiasson | B66C 23/84 |

FOREIGN PATENT DOCUMENTS

| | | |
|---|---|---|
| CN | 202671068 U | 1/2013 |
| CN | 103256266 A | 8/2013 |
| CN | 10264782 B | 1/2014 |
| DE | 3926920 A1 | 5/1990 |
| DE | 102005025646 A1 | 12/2006 |
| DE | 102012019248 A1 | 4/2014 |
| EP | 0384112 A2 | 8/1990 |
| EP | 2481853 A1 | 8/2012 |
| EP | 2644557 A1 | 10/2013 |
| GB | 1048722 A | 11/1966 |
| GB | 1340391 A | 12/1973 |
| JP | 52-153275 U | 11/1977 |
| JP | 57-000585 U | 1/1982 |
| JP | 2000-007282 A | 1/2000 |
| JP | 2001-097684 A | 4/2001 |
| JP | 2005-082352 A | 3/2005 |
| JP | 2007-172766 A | 7/2007 |
| JP | 2007-186307 A | 7/2007 |
| JP | 2009-110383 A | 5/2009 |
| JP | 2012-507427 A | 3/2012 |
| JP | 2012-092534 A | 5/2012 |

* cited by examiner

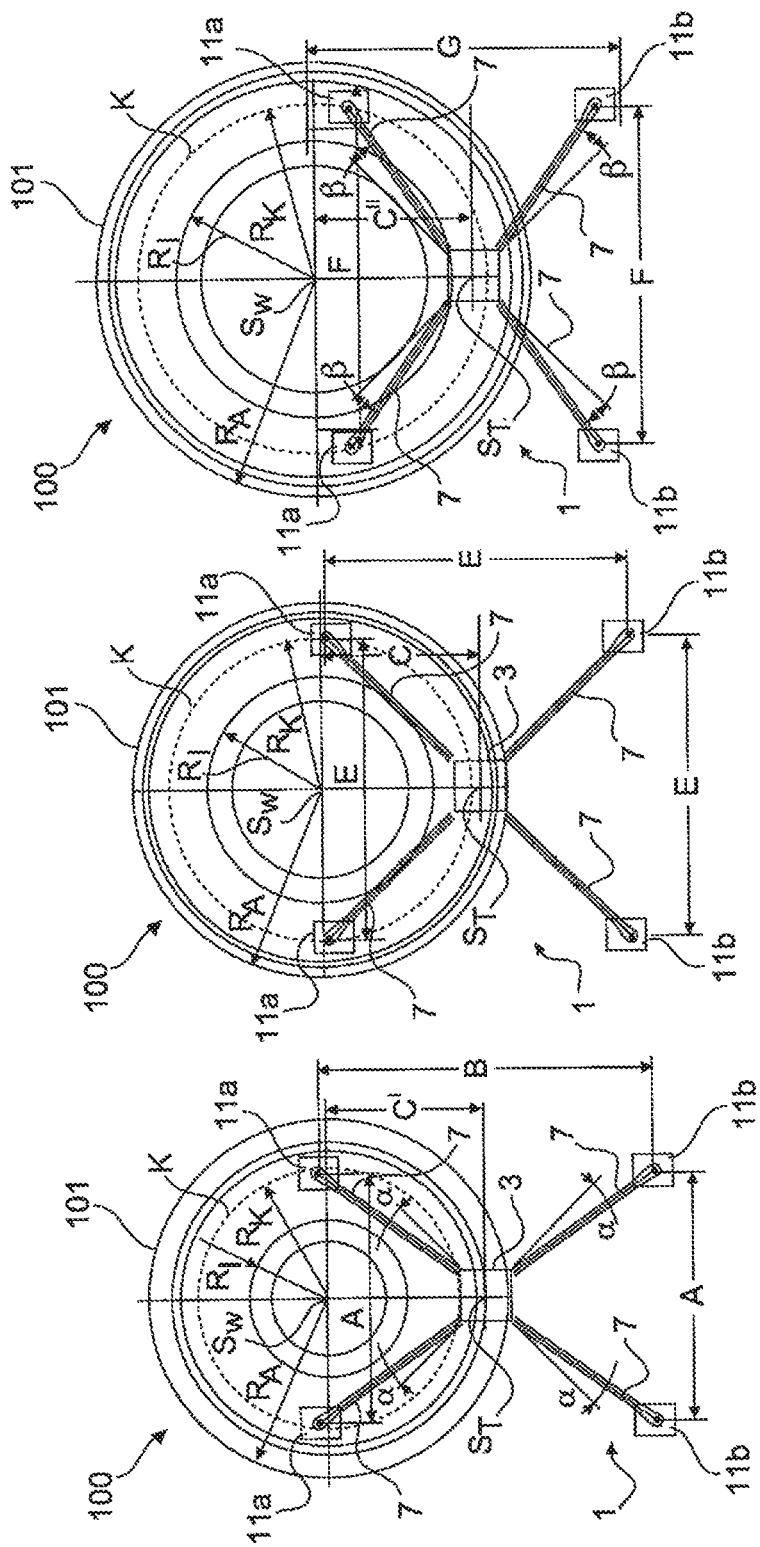

TOWER CRANE FOR ERECTING A WIND TURBINE, AND METHOD FOR ERECTING SAID TOWER CRANE

BACKGROUND

Technical Field

The present invention relates to a rotating tower crane for erecting a wind turbine, having a tower and a tower substructure, which is connected to the tower and is intended for supporting the tower, wherein the tower substructure has a supporting cross frame, which has three or more, preferably four, legs extending from the tower.

Description of the Related Art

Rotating tower cranes of the type mentioned above are usually used for erecting high structures such as, in particular, towers of wind turbines, because they can deliver very high loads to very great heights. A critical factor for the operation of such rotating tower cranes is the capability of the crane systems to be moved to the installation site of the wind turbine and to be constructed, and dismantled, there in the shortest possible period of time. This is important, in particular, given that wind turbines are often erected in remote regions with hardly any infrastructure, if any at all. In particular in wooded regions or on slopes, furthermore, often only restricted areas of ground are available for installing the wind turbines, and in these cases it is also crucial that the rotating tower cranes—and the wind turbines—can be erected in only a small amount of space. It is also important, in view of these space conditions, for it to be possible for the rotating tower cranes to be placed as closely as possible to the wind-turbine tower which is to be erected.

The prior art discloses rotating tower cranes in which the tower substructure is fixed to the wind-turbine foundation by means of foundation anchors. At least parts of this fastening remain, following completion of the wind turbine, in the foundation, because they have been cast in there. Valuable resources are wasted here. Furthermore, the amount of time required for such anchoring purposes is considered to be disadvantageous because it increases the overall amount of time required for erecting the wind turbine.

BRIEF SUMMARY

Provided is a rotating tower crane which allows a wind turbine to be erected in a more cost-effective and preferably less time-consuming manner.

The rotating tower crane, according to a first aspect, has each leg fastened on it, on the ground side, a load-distributor plate, which is not connected to the foundation, wherein the load-distributor plates together form the ballast of the tower. The load-distributor plates are dimensioned sufficiently both in respect of their standing surface area and in respect of their weight, there is no need for the rotating tower crane to be anchored on the foundation in order to ensure its stability. This is achieved, in particular, in that the load-distributor plates are heavy enough to replace the central ballast which is otherwise customary in previously known rotating tower cranes, and has otherwise had to be arranged in the vicinity of the tower. The necessary size and the weight of the load-distributor plates can be calculated in a generally known manner, taking account of the aforementioned loading on the rotating tower crane and site-independent influencing factors.

In a second aspect, the tower substructure has a levelling device, wherein the levelling device has four separately activatable cylinders. The levelling device preferably has sensors for sensing the lifting-direction force acting on the cylinders, and/or pressure sensors for sensing the fluid pressure acting on the cylinders, and/or an inclination sensor, and/or one or more sensors (preferably at least one sensor for each cylinder) for sensing the cylinder stroke.

The cylinders are preferably designed in the form of fluid-actuated cylinders, in particular of pneumatic or hydraulic cylinders. For force-measuring purposes, in said embodiment, use is preferably made of pressure sensors. Using the fluid pressure acting on the cylinders, it is possible, directly via the cylinder surface, to infer the forces which act on each cylinder. The tower is levelled, and supported uniformally by all four legs, when the forces acting on the cylinders are equal in all cases. An inclination sensor, preferably designed in the form of a biaxial inclination sensor, preferably serves as an additional information source. A comparison of the information from these two measuring systems can be utilized, for example, for detecting malfunctions and for generating corresponding fault signals.

It is further preferable for the rotating tower crane to have one or more absolute measuring systems, for example displacement-measuring sensors, for sensing the cylinder stroke actually covered by the cylinders. This information makes it easier for an operator to decide whether, in the event of a force imbalance in the cylinders being established, a cylinder still has to be extended further, or possibly has to be retracted, in order to come into line with the rest of the cylinders. In a preferred embodiment, the levelling device has an electronic control device, preferably a programmable controller, for activating the cylinders. The electronic control device is preferably intended to activate one or more, or all, of the cylinders such that the tower is oriented vertically, in dependence on at least one of the following variables: angle of inclination of the tower, fluid pressure acting on the cylinders, and cylinder stroke covered by the cylinders. For this purpose, the control device is connected preferably for signal-transfer purposes to the corresponding sensors and is programmed for receiving, processing and emitting corresponding signals and processing results.

In dependence on legal requirements, it may be necessary not to give the control device full autonomy for orienting the tower, but to give an operator the ultimate power of decision and control in relation to the orienting operation. In this case, a preferred embodiment is one in which the electronic control device is intended to establish a recommendation for the activation of one or more cylinders and to generate a signal which can be read by the operator and is representative of the recommendation, in dependence on at least one of the following variables: angle of inclination of the tower, fluid pressure acting on the cylinders, cylinder stroke covered by the cylinders.

The representative signal may be such, for example, that a cylinder is displayed and, for this cylinder, a corresponding signal, according to which the cylinder should be further extended or retracted, is displayed. A straightforward option, which is easy to read even on a construction site, would be, for example, color-coded lighting means, for example red and green lamps (light-emitting diodes or the like) assigned to each cylinder.

In an advantageous configuration, the electronic control device is programmed to give the operator control via a master cylinder, the operator lowering the latter on to the load-distributor plate, and then to readjust automatically the rest of the cylinders, which run, as it were, in slave mode, in dependence on the control commands of the operator.

The levelling device preferably has a display unit, which is intended to display one or more, or all, of the following variables: angular position of the tower, loading on the cylinders, operating mode of the levelling device, fault messages, system pressures, position of the cylinders on the supporting cross frame, the cylinders recommended for activation, and the control recommendation.

In a further preferred embodiment, which, in a third aspect, is also a separate subject matter of the invention, adjacent legs of the supporting cross frame of the rotating tower crane, in a zero position, are oriented in relation to one another at the same angle, in the case of three legs 120° and in the case of four legs at an angle of in each case 90°, etc., and one or more, or all, of the legs, preferably all of the legs, are arranged in an articulated manner on the supporting cross frame such that they can be deflected out of the zero position by an adjustment angle. This configuration is based on the towers of the wind turbines which are to be erected differing significantly, depending on the height of the tower, at their base. It is not cost effective for any company undertaking the operation of erecting wind turbines to keep in store, for every different type of tower construction, a dedicated rotating tower crane, which would be made for positioning relative to this specific tower. The endeavor, in principle, is to make it possible for the rotating tower crane to be brought up as closely as possible to the tower of the wind turbine which is to be erected, in particular in view of the fact that, from certain installation heights, rotating tower cranes are fastened by means of mechanical struts on the erected tower of the wind turbine itself. For this reason alone, the distances between the tower and wind turbine are to be kept as small as possible, so that load or wind induced vibration can have the least possible adverse effect on the tower and rotating tower crane coupled in this way.

In the case of a relatively large wind-turbine tower, with the lower most tower segment having a relatively large base diameter, a tower with a conventional, rigid, supporting cross frame would inevitably have to have the center of the rotating tower crane located further away from the center of the wind-turbine tower, because the supporting cross frame cannot advance up to the tower closer than its structural dimensions allow. Given that the legs of the support can be pivoted in a horizontal plane, that is to say laterally, it is still possible, even in the case of towers of relatively large diameter, to advance up closely to the tower by virtue of the legs being spread further apart relative to the zero position. Such a technical configuration can also be combined particularly advantageously with the use of the load-distributor plates. At the same time, in the case of towers with a relatively small base diameter, it is made possible, by virtue of the legs of the supporting cross frame being brought closer, relative to the zero position, to the tower of the wind turbine, to set the same distance between the center axes of the rotating tower crane and the wind-turbine tower as would also be maintained for larger wind turbines. This makes it possible to use, for example, identical staying systems for all sizes of tower. Furthermore, the pivotability of the legs of the section cross frame makes it possible for the legs to have their force-introduction point, and preferably thus also the load-distributor plates, set up always in the center of the foundation, in a region which is well suited for force-absorption purposes. This increases the safety of the installation.

In a preferred development of this aspect, the adjustment angle ranges from ±10° or more around the zero position, and can be set preferably in steps of 5°.

In a further embodiment, which at the same time constitutes a separate, fourth aspect of the invention, the tower has at least one strut, but preferably two, three or more than three struts, for fastening the rotating tower crane at a first height, or, in addition, at a second, third and further heights, on the tower of the wind turbine which is to be erected, wherein the struts has in each case one or more hydraulically actuated telescopic retaining arms. Struts for fastening rotating tower cranes on structures are already known in principle. Up until now, however, the struts have been adjusted in length by purely mechanical means. For this purpose, the previously known struts have platforms, which have to be accessed high up by operating staff. Working high up is associated with the known risks, and it has therefore been an approach to reduce manual intervention as far as possible. The pneumatic or hydraulic actuation of the retaining arms is considered, in this respect, to be a considerable contribution to safety, especially since operation can be initiated remotely, for example from the ground.

The retaining arms are moved, preferably automatically or by remote control, from a retracted position into an extended position, and are intended, in the extended position, to be connected to the tower in a reversibly releasable manner by means of a coupling. The reversibly releasable connection is understood to mean a connecting and releasing operation which can be repeated as often as desired and can be carried out in a non destructive manner.

In the case of the methods described in the introduction of erecting a rotating tower crane for erecting a wind turbine, in particular methods of erecting a rotating tower crane according to one of the preferred embodiments described herein, includes the following steps: supplying a foundation for the wind turbine, positioning two load-distributor plates above the foundation, with no connection to the foundation, positioning one or more, preferably two, load-distributor plates alongside the foundation on a ground surface, with no connection to the ground surface, connecting the load-distributor plates to the tower by means of a supporting cross frame having three or more, preferably four, legs, and erecting the tower, wherein the load-distributor plates form the ballast of the tower.

In respect of the advantages and preferred embodiments of the method, reference is also made to what has been said above relating to all the aspects of the rotating tower crane. A central advantage is considered to be the fact that using the load-distributor plates, which are positioned above the foundation or on the ground surface alongside the foundation, with no connection thereto, can cut back on significant amounts of materials, since the operations of casting and fastening foundation anchors in the wind-turbine foundation can be dispensed with. The load-distributor plates can be transported by customary vehicles and can be positioned straightforwardly at the wind-turbine site such that the tower stands in optimum fashion relative to the wind turbine. Since the load-distributor plates themselves already form the ballast of the tower, and therefore render any additional central ballast superfluous, the amount of time required for installing the same is also cut.

The method is preferably developed by the tower being levelled by means of a levelling device. In a further aspect, a method is provided having the following steps: supplying a foundation for the wind turbine, positioning two load-distributor plates above the foundation, with no connection to the foundation, positioning one or more, preferably two, load-distributor plates alongside the foundation on a ground surface, with no connection to the ground surface, connecting the load-distributor plates to the tower by means of a supporting cross frame having three or more, preferably four, legs, erecting the tower, and levelling the tower by means of a levelling device.

The levelling operation preferably comprises one or more, or all, of the following steps: sensing the angle of inclination of the tower, sensing the fluid pressure acting on one or more cylinders, sensing the cylinder stroke of one or more cylinders, actuating one or more cylinders in dependence on one or more of the variables sensed, in order to orient the tower vertically.

The levelling operation further preferably comprises one or more, or all, of the following steps: establishing a recommendation, preferably by means of an electronic control device, for the activation of one or more cylinders in dependence on at least one of the following variables on a display unit: angle of inclination of the tower, fluid pressure acting on the cylinders, cylinder stroke covered by the cylinders; generating a signal which can be read by an operator and is representative of the recommendation; displaying one or more, or all, of the following variables: angular position of the tower, loading on the cylinders, operating mode of the levelling device, fault messages, system pressures, position of the cylinders on the supporting cross frame, the cylinders recommended for activation, the control recommendation.

In a further preferred embodiment, which is also a separate aspect of the invention, the positioning of two load-distributor plates above the foundation, with no connection to the foundation, takes place such that the centers of mass of the load-distributor plates positioned above the foundation are arranged on a common circular path, preferably concentrically with the center axis of the wind-turbine tower.

Provided is a method comprising the following steps: supplying a foundation for the wind turbine, positioning two load-distributor plates alongside the foundation on a ground surface, with no connection to the ground surface, and positioning two load-distributor plates above the foundation, with no connection to the foundation, such that the centers of mass of the load-distributor plates positioned above the foundation are arranged on a common circular path, preferably concentrically with the center axis of the wind-turbine tower.

This configuration makes use of the finding that it is advantageous, for load absorption in the wind-turbine foundation, for said operation to be initiated in as uniform and well distributed a manner as possible. It has been found, for this purpose, that it is advantageous to arrange the centers of mass of the load-distributor plates on a common circular path.

The method, according to this aspect, is advantageously developed by the common circular path having a radius $R_K$, which is defined by the equation $$R_K = x \cdot \frac{R_A + R_I}{2},$$

where x ranges from 0.8 to 1.4, further preferably from 0.85 to 1.15, and particularly preferably ranges from 0.9 to 1.1. Adhering to this ensures that the load-distributor plates are placed on the foundation neither too far outwards nor too far inwards, and this makes possible a favorable introduction of forces over the largest possible region of the foundation without the maximum permitted surface pressure being exceeded. $R_I$ here preferably denotes the outer radius of the foundation skid, through which the tower-tensioning strands run. $R_A$ here preferably denotes the outer radius of the foundation, for example a surface foundation with buoyancy (FlmA). As an alternative, $R_A$ denotes the outer radius of a surface foundation without buoyancy (FloA) or a deep foundation with buoyancy (TgmA).

The method is preferably developed by the following step: deflecting the legs out of a zero position by an adjustment angle such that the bottom points of the legs are arranged on the common circular path, preferably in a range of at least +/−10°, particularly preferably in steps of 5°.

Here too, in respect of the advantages of the pivotable configuration of the legs, reference is made to what has been said above relating to the rotating tower crane.

BRIEF DESCRIPTION OF THE SEVERAL VIEWS OF THE DRAWINGS

The invention will be described in more detail hereinbelow by way of a preferred exemplary embodiment and with reference to the accompanying figures, in which.

DETAILED DESCRIPTION

Figure 1:
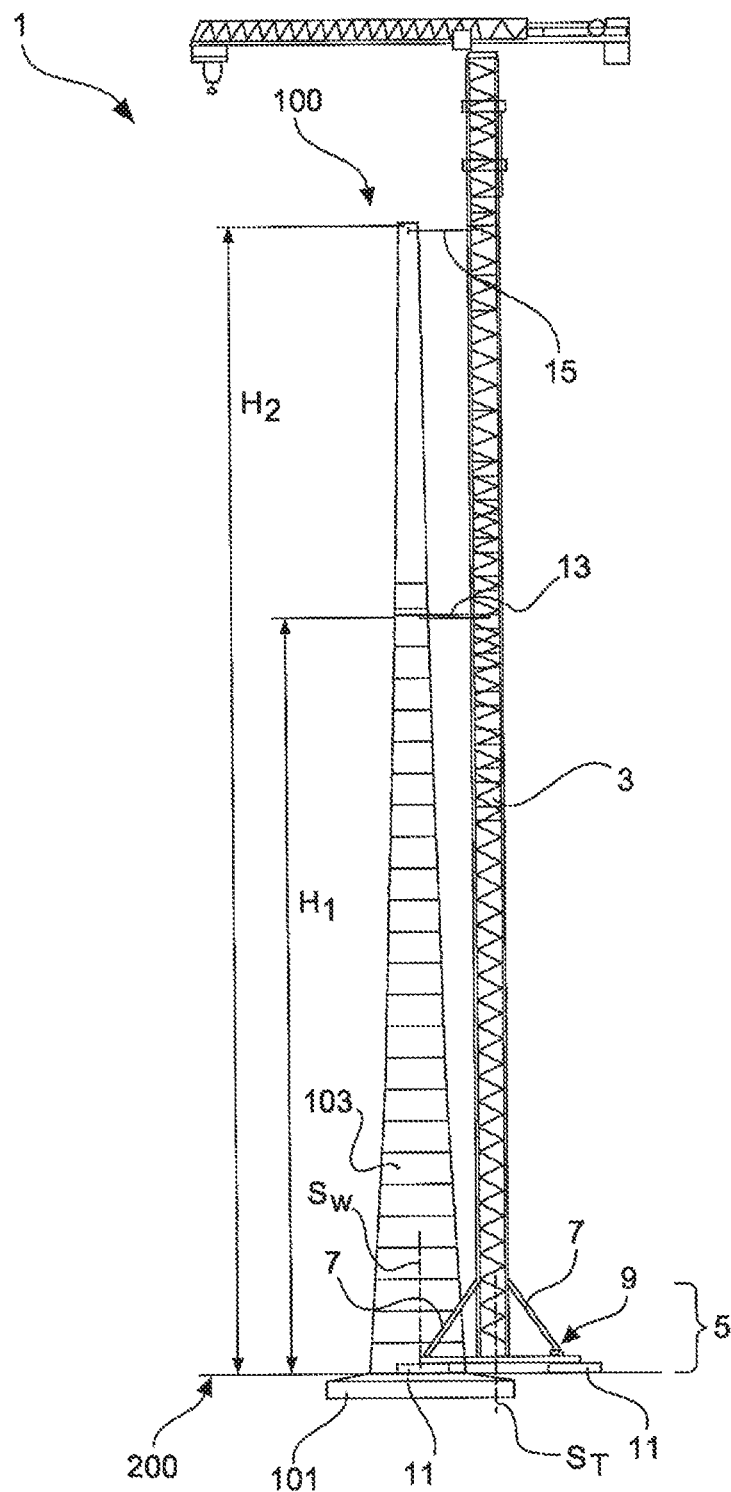
FIG. 1 shows a schematic side view of a rotating tower crane during the operation of erecting a wind turbine according to a first exemplary embodiment.

FIG. 1 depicts a rotating tower crane 1. The rotating tower crane is a so-called top-slewing crane, having a stationary tower 3 constructed on, and supported by, a tower substructure 5. The tower substructure 5 has a total of four legs 7 intended for supporting purposes. The legs 7 of the tower 1 are connected at their bottom regions 9 in each case to a load-distributor plate 11a, b. The load-distributor plates 11a, b stand on the ground region 200, wherein two 11b of the four load-distributor plates stand on the ground, with no connection to the ground, alongside a foundation 101 of a wind turbine 100 which is to be erected, and two further load-distributor plates 11a are arranged above the foundation 101, with no connection to the foundation 101.

The wind turbine 100 has a multiplicity of tower segments 103, which are raised one after the other, and positioned on the tower segments beneath, by the rotating tower crane 1. The wind turbine 100 has a center axis $S_W$, whereas the tower has a center axis $S_T$.

At a height $H_1$, the rotating tower crane 1 has a first strut 13, by means of which the rotating tower crane 1 is fastened on the tower of the wind turbine 100. The fact that the tower segments 103 are already braced to the foundation 101 at this height $H_1$ provides the rotating tower crane 1 with additional stability.

In view of the tendency towards wind-turbine towers of increasing height, provided is, from a certain height $H_2$, for example above 140 m, for a second bracing means, by brace 15, to be fitted between the rotating tower crane 1 and the tower of the wind turbine 100. It is potentially possible, in the case of towers increasing to further heights, which, for the sake of simplicity, is not illustrated here, for further bracing means to be fitted.

Figure 2:
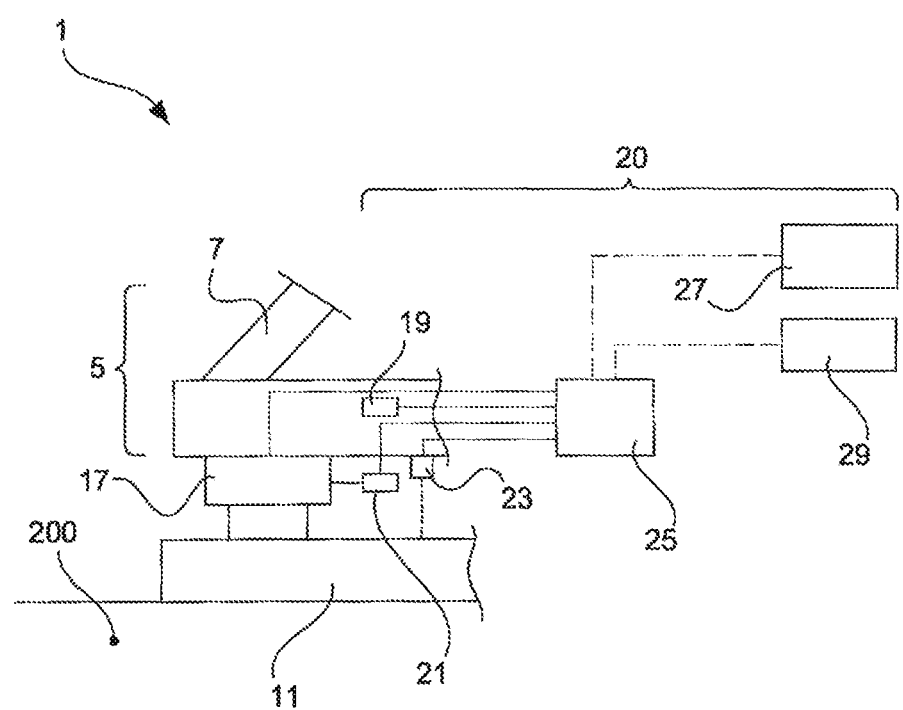
FIG. 2 shows a schematic illustration of a detail of the rotating tower crane from FIG. 1, and FIGS. 3a-c show schematic plan views of the rotating tower crane according to FIGS. 1 to 2 in different operating positions.

FIG. 2 illustrates, schematically, the bearing region of one of the load-distributor plates 11 on the ground region 200. The tower substructure 5, and with it the rotating tower crane 1 as a whole, has to be oriented vertically in order for the rotating tower crane 1 to operate safely. For this purpose, the rotating tower crane 1 has a levelling device 20. The levelling device 20 has a cylinder 17, for example a hydraulic cylinder, preferably for each load-distributor plate 11a, b and each leg 7 of the tower substructure 5. The cylinder 17 is connected for signal-transfer purposes to an electronic control device 25, preferably a programmable controller, and can be activated thereby. Furthermore, the cylinder 17 is connected to a pressure sensor 21, which, for its part, is connected for signal-transfer purposes to the electronic control device 25. The tower substructure 5 preferably also bears, for the levelling device 20, an inclination sensor 19, which is connected for signal-transfer purposes to the electronic control device 25.

An absolute encoder 23 for establishing the cylinder stroke covered by the cylinder is preferably provided either on the tower substructure 5 or, as an alternative to the variant shown, directly on the cylinder 17. This absolute encoder may be, for example, an optical sensor. It is also the case that the absolute encoder 23 is connected for signal-transfer purposes to the electronic control device 25.

The electronic control device 25, for its part, is connected for signal-transfer purposes, optionally by cables or wirelessly, to a display unit 27 and an operating element 29. The electronic control device 25 is intended, in dependence on the pressures established for the cylinder 17, and/or on the inclination established, and/or on the cylinder strokes covered, to establish an adjustment recommendation for the cylinders 17 and to transmit this to the display unit 27. It is possible for the operator, preferably by means of the operating element 29, to input a command which follows the recommendation, or to input a differing command manually. As an alternative, the electronic control device 25 is set up preferably to execute the alignment operation autonomously, provided this complies with legal requirements.

The electronic control device preferably has a control module, which is programmed to enable or to block, depending on the legal requirements at the site of the rotating tower crane 1, the autonomous levelling function following input of a password.

FIGS. 3a-c show a further aspect of the invention. FIGS. 3a-c illustrate a plan view of the positioning of the rotating tower crane 1 relative to the wind turbine 100, in particular relative to the foundation 101 thereof.

The foundation 101 has an outer circumference of radius $R_A$ and a skid of radius $R_I$.

In FIG. 3b, the legs 7 of the rotating tower crane 1 are arranged in a zero position. In this zero position, respectively adjacent legs, in the horizontal plane illustrated, define an essentially right angle, preferably precisely a right angle, in relation to one another. The load-distributor plates 11a, and with them the legs 7, are arranged such that they are located, preferably by way of their center of mass, above the foundation 101 on a common circular path K. The radius $R_K$ of the circular path K has preferably been established as referred to above.

This positioning results in the rotating tower crane 1 being spaced apart by a distance C, as measured from its center axis $S_T$ to the center axis $S_W$ of the wind turbine 100.

On account of the zero position, the direct distance between the bottom regions of the legs 7 is always equal and assumes the value E.

In comparison with the zero position according to FIG. 3b, the rotating tower crane in FIG. 3a is used for a wind turbine 100 of which the foundation 101—and also the tower—have a smaller diameter than in FIG. 3b. In the state which is shown in FIG. 3a, the legs 7, rather than being located in the zero position, have been deflected by an angle α. As a result, the bottom regions of the legs 7 on the load-distributor plates 11a, and with them the load-distributor plates 11a themselves, are closer together than in FIG. 3b and so are spaced apart from one another by the distance A, which is smaller than distance E. The load-distributor plates 11a, however, are likewise arranged on a common circular path K of radius $R_K$, said circular path having been determined as referred to above. As a result of this, and of the legs 7 being adjusted by the angle α, it is also possible for the distance between the rotating tower crane 1 and the wind turbine 100 in the state according to FIG. 3a to be essentially equal to the distance which has been set in FIG. 3b. The center axis $S_T$ of the rotating tower crane 1 is spaced apart by the distance CC from the center axis $S_W$ of the wind turbine 100 in FIG. 3a.

FIG. 3c depicts the other extreme in relation to FIGS. 3b and 3a. The wind turbine 100 according to FIG. 3c has a larger foundation diameter 101 and, with this, a larger tower diameter at the base. Here, then, the legs 7 and the load-distributor plates 11a have been deflected out of the zero position in the direction opposite to that in FIG. 3a, to be precise by an angle β. This means, then, that the distance F between the bottom regions of the legs 7 and the load-distributor plates 11a is larger than the value E in FIG. 3b, whereas the distance between the load-distributor plates 11a and 11b and the respective bottom regions of the legs 7, which are connected to said load-distributor plates, is smaller and assumes a value G. For the case where the angle β is equal to angle α, value G corresponds to the value A, while the value F corresponds to the value B.

It is also the case in the exemplary embodiment according to FIG. 3c that the load-distributor plates 11a are arranged, preferably by way of their center of mass, on a common circular path K of radius $R_K$, which has been established as referred to above. It is thus made possible, even in the case of a relatively large foundation, as shown here in FIG. 3c, to set essentially the same distance between the rotating tower crane 1 and the wind turbine 100. The distance in this case between the center axis $S_T$ of the rotating tower crane 1 and the center axis $S_W$ of the wind turbine 100 is equal to the value C'.

In order to provide a reference point for the range of use of the rotating tower crane, it can be assumed that the installation height of the tower of the wind turbine 100 in FIG. 3a is approximately 100 m, whereas the tower height of the wind turbine 100 in FIG. 3b is approximately 125 m, and the tower height of the wind turbine 100 in FIG. 3c is approximately 150 m. The distances C, C' and C" are each approximately 9.5 m. The radii $R_A$, in the three exemplary embodiments, are between approximately 10.70 m (FIG. 3a) and 13 m (FIG. 3c). The values for $R_I$ are between approximately 4.70 m (FIG. 3a) and approximately 8.50 m (FIG. 3c). The values for the distances A to F fluctuate between approximately 15 m (A, G) and approximately 20.5 m (B, F).

The load-distributor plates 11 weigh, by way of example, approximately 20 t each.

It would optionally also be possible for the load-distributor plates to have a unit weight, for example, ranging from approximately 10 t to approximately 40 t, for example approximately 24.5 t, so that, in the case of less pronounced or in the case of more pronounced transverse loads, etc., it is still the case that sufficient ballasting is provided for rotating tower cranes of the order of magnitude presented.

The invention claimed is:

1. A rotating tower crane for erecting a wind turbine on a foundation, the rotating tower crane comprising:
    a tower; and
    a tower substructure coupled to the tower and configured to support the tower, the tower substructure having a supporting cross frame that includes at least three legs, the at least three legs having first ends and second ends, the first ends being coupled to the tower, the second opposing ends coupled to load-distributor plates, the load-distributor plates being on the foundation or a ground surface without being fixed to the foundation and together forming a ballast of the tower,
    wherein the at least three legs extend at an angle inclined relative to a plane of the foundation.

2. The rotating tower crane according to claim 1, wherein the tower substructure has a levelling device, and wherein the levelling device has four cylinders, the four cylinders being separately activatable.

3. The rotating tower crane according to claim 2, wherein the levelling device includes at least one of:
    force-measuring sensors configured to sense the forces acting on the four cylinders,
    pressure sensors configured to sense fluid pressure acting on the four cylinders,
    an inclination sensor, or
    at least one sensor for each of the four cylinders, each of the at least one sensors being configured to sense a cylinder stroke.

4. The rotating tower crane according to claim 2, wherein the levelling device has an electronic control device.

5. The rotating tower crane according to claim 4, wherein the electronic control device is configured to activate one or more of the four cylinders in dependence on at least one of the following variables:
    an angle of inclination of the tower,
    a force acting on the respective cylinder,
    fluid pressure acting on the respective cylinder, or
    a cylinder stroke covered by the respective cylinder.

6. The rotating tower crane according to claim 4, wherein the electronic control device is configured to establish a control recommendation for activating one or more of the four cylinders and to generate a signal indicative of the control recommendation, wherein the control recommendation depends on at least one of the following variables:
    angle of inclination of the tower,
    force acting on the cylinders,
    fluid pressure acting on the cylinders, or
    cylinder stroke covered by the cylinders.

7. The rotating tower crane according to claim 6, wherein the levelling device has a display unit configured to display one or more of the following variables:
    angular position of the tower,
    loading on one or more of the four cylinders,
    operating mode of the levelling device,
    fault messages,
    system pressures,
    position of one of the four cylinders on the supporting cross frame,
    one of the four cylinders recommended for activation, or
    the control recommendation.

8. The rotating tower crane according to claim 1, wherein adjacent legs of the supporting cross frame, in a zero position, are oriented in relation to one another at an angle of 90°, and one or more of the legs are arranged in an articulated manner on the supporting cross frame such that the one or more legs are deflected out of the zero position by an adjustment angle.

9. The rotating tower crane according to claim 8, wherein the adjustment angle ranges from +/−10°.

10. A rotating tower crane for erecting a wind turbine on a foundation, the rotating tower crane comprising:
    a tower;
    a tower substructure coupled to the tower and configured to support the tower, the tower substructure having a supporting cross frame that includes at least three legs extending from the tower, the at least three legs having ends and load-distributor plates coupled to the ends, the load-distributor plates being on the foundation or a ground surface without being fixed to the foundation and together forming a ballast of the tower; and
    at least one strut configured to fasten the rotating tower crane to the tower of a wind turbine to be erected at at least one first height, wherein the at least one strut has one or more pneumatically or hydraulically actuated telescopic retaining arms configured to be moved between a retracted position and an extended position and in the extended position configured to be connected to the tower in a reversibly releasable manner by a coupling.

11. A method comprising:
    erecting a rotating tower crane for erecting a wind turbine, wherein the erecting the rotating tower crane comprises:
        forming a foundation for the wind turbine;
        positioning two first load-distributor plates on the foundation without fixing the two first load-distributor plates to the foundation;
        positioning one or more second load-distributor plates alongside the foundation on a ground surface without fixing the one or more second load-distributor plates to the ground surface;
        connecting the two first load-distributor plates and the one or more second load-distributor plates to a lower portion of the tower crane by a supporting cross frame having three or more legs, wherein the three or more legs have first ends coupled to the lower portion of the tower crane and second ends coupled to a respective one of the two first load-distributer plates on the foundation and the one or more load-distributor plates alongside the foundation, wherein the at least three legs extend at an angle inclined relative to a plane of the foundation; and
        erecting the tower crane, wherein the two first load-distributor plates and the one or more second load-distributor plates form a ballast of the tower crane.

12. A method comprising:
    positioning two first load-distributor plates above a foundation for a wind turbine, wherein the first load-distributor plates are not fixed to the foundation;
    positioning two second load-distributor plates alongside the foundation on a ground surface, wherein the second load-distributor plates are not fixed to the ground surface;
    connecting the first and second load-distributor plates to a lower portion of a tower by a supporting cross frame having three or more legs, wherein the three or more legs have first ends coupled to the lower portion of the tower crane and second ends coupled to a respective one of the two first load-distributer plates on the foundation and the one or more load-distributor plates alongside the foundation, wherein the at least three legs extend at an angle inclined relative to a plane of the foundation;
erecting a remaining portion the tower; and
levelling the tower by a levelling device.

13. The method according to claim 12, wherein the levelling comprises one or more of the following:
sensing an angle of inclination of the tower;
sensing a force acting on one or more cylinders of the levelling device;
sensing a fluid pressure acting on the one or more cylinders;
sensing a cylinder stroke of the one or more cylinders; and
actuating the one or more cylinders in dependence on one or more of the sensed angle, sensed force, sensed fluid pressure, and sensed cylinder stroke in order to orient the tower vertically.

14. The method according to claim 13, wherein the levelling comprises one or more of the following:
establishing a recommendation for activating the one or more cylinders in dependence on at least one of the following variables on a display unit:
angle of inclination of the tower,
force acting on the one or more cylinders,
fluid pressure acting on the one or more cylinders, and
cylinder stroke covered by the one or more cylinders,
the method further comprising generating a signal indicative of the recommendation, and displaying one or more of the following variables:
angular position of the tower,
loading on the one or more cylinders,
operating mode of the levelling device,
fault messages,
system pressures,
position of the one or more cylinders on the supporting cross frame, and
the recommendation.

15. The method according to claim 12, wherein positioning two first load-distributor plates and positioning two second load-distributor plates includes positioning the first and second load-distributor plates, such that centers of mass of the first and second load-distributor plates are arranged on a common circular path.

16. The method according to claim 15, wherein the common circular path has a radius $R_K$, which is defined by the equation $$R_K = x \cdot \frac{R_A + R_I}{2},$$

where x ranges from 0.8 to 1.4.

17. The method according to claim 15, comprising:
deflecting the legs out of a zero position by an adjustment angle such that the bottom points of the legs are arranged on the common circular path.

18. The method according to claim 15, wherein the common circular path is concentrically with a center axis of a wind-turbine tower.

19. The method according to claim 15, wherein the common circular path is in a range from +/−10°.

20. The rotating tower crane according to claim 4, wherein the electronic control device is a programmable controller configured to activate the one or more cylinders.

* * * * *